May 9, 1939.    B. J. PEPPER    2,157,627
PRICE AND QUANTITY INDICATING COUNTER
Filed June 11, 1936    2 Sheets-Sheet 1

INVENTOR
Byron J. Pepper
By
ATTORNEY

May 9, 1939.  B. J. PEPPER  2,157,627
PRICE AND QUANTITY INDICATING COUNTER
Filed June 11, 1936  2 Sheets-Sheet 2
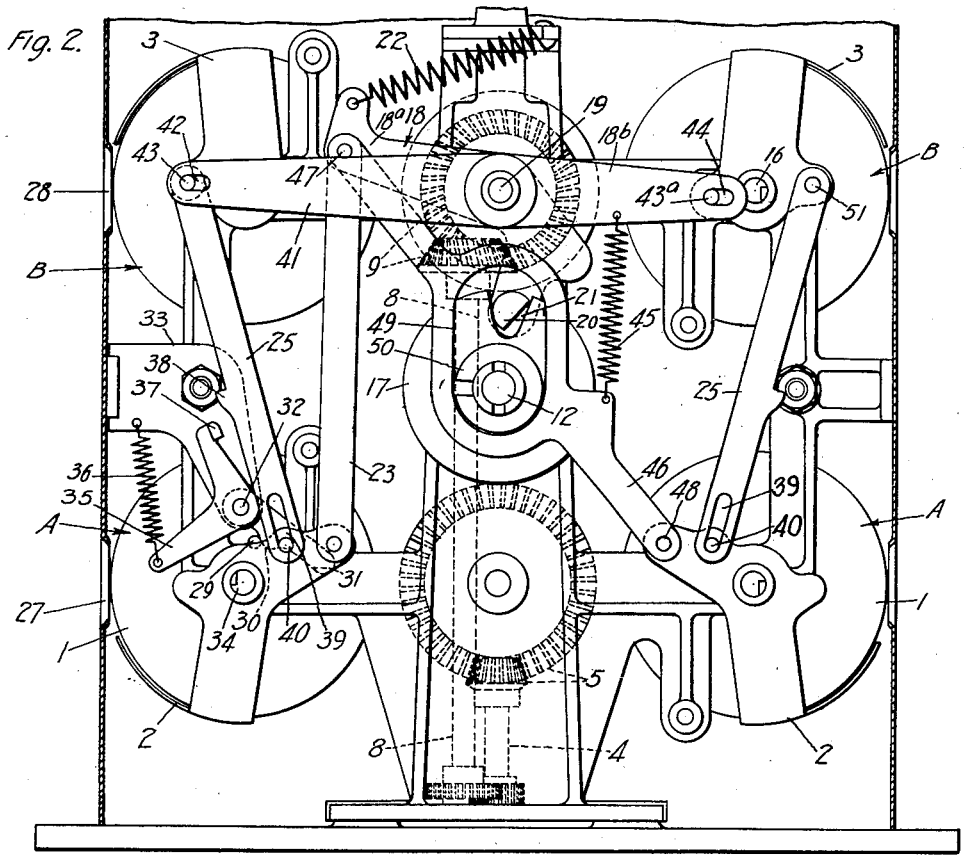
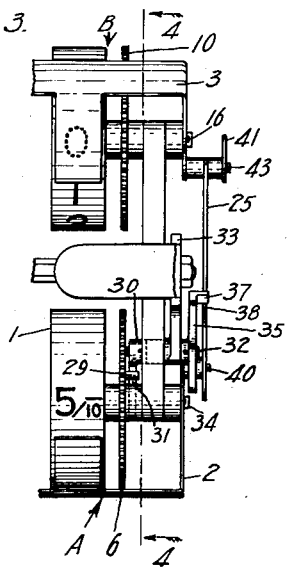
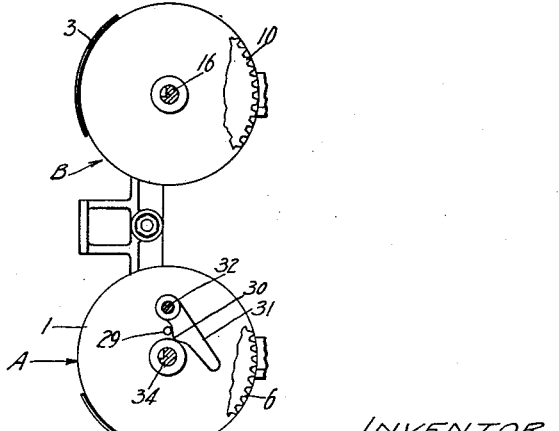
INVENTOR
Byron J. Pepper
By
ATTORNEY Patented May 9, 1939

2,157,627

UNITED STATES PATENT OFFICE 2,157,627

PRICE AND QUANTITY INDICATING COUNTER

Byron J. Pepper, Fort Wayne, Ind., assignor, by mesne assignments, to The Wayne Pump Company, a corporation of Maryland Application June 11, 1936, Serial No. 84,600

13 Claims. (Cl. 235—144)

My invention relates to price and quantity indicating counters.

In certain jurisdictions, the regulations relative to testing such counters for official approval prior to authorized use in dispensing liquids, such as gasoline or the like, require that a test be made at the first gallon indication and that this gallon be obtained by as many complete operations as there are fractions of said gallon indicated on the pump, official approval not being given unless the error per gallon found in the test is below a prescribed percentage. This means that where the first indication is very low, as it is in such counters, ordinarily corresponding to a tenth of a gallon, the pump has to be reset after each tenth of a gallon is dispensed, and started again, this procedure being continued until a full gallon is dispensed. Accordingly, although such counters are sufficiently accurate to meet official requirements in other jurisdictions, the above testing method makes any error due to backlash in each resetting operation accumulative and proportionately far greater per gallon than it would be if the pump were operated to pump the test gallon in a single continuous operation, i. e. in a normal manner. Further, under these same regulations and to furnish the customer the same protection if he elects to buy by the money indication on the price indicator, the sale for cash of any volume less than the price of the first indication on the quantity indicating counter is prohibited, thereby making it impossible for the price counter of such counters, which start to compute the price from zero, to be used. Accordingly, due to these provisions of the regulations in question, price and quantity indicating counters of standard construction which are adapted to indicate each tenth of a gallon as pumped and also indicate the cost thereof as pumped, and which would more than satisfy the requirement as to allowed minimum error in any jurisdiction were a gallon of gasoline dispensed in one continuous operation, fail to meet the requirements of such regulations.

My invention has among its objects to provide an improved counting mechanism of the character set forth which is provided with improved means for enabling such a counter to meet such a situation and protect the customer while demonstrating its accuracy. A further object of my invention is to provide improved mechanism whereby it is made possible to delay the first visible indication on either the price or quantity counter until a larger quantity of gasoline than a tenth of a gallon has been dispensed, and whereby, due to a resultant reduction in the number of resetting operations, it is made possible to overcome the accumulative error mentioned and demonstrate that the percentage of error in the first gallon pumped is well below the official requirements while still keeping the amount less than a minimum normal sale. A still further object of my invention is to provide improved shutter mechanism associated with both the cost and quantity counters which is adapted to maintain the cost counter hidden, in such manner as thereby to preclude any cash sale based thereon, until a larger minimum amount has been indicated upon the quantity counter, and which then exposes the cost counter. A yet further object of the invention is to provide a device wherein price indicating or exhibiting means may be used either alone or in combination with other means, such as quantity indicating or exhibiting means or a means operated by a different portion of the driving means than operates the price indicating means for revealing the price and means after it has been concealed by suitable means, as a shutter controlled by reset mechanism. By way of further explanation, it may be said that where the price exhibiting means is used alone operated through means such as a variator driven by the driving means, it is concealed by a shutter during reset and for a predetermined dispensing operation, after which it is unshrouded by a portion of the driving means preferably independent of the variator or that portion of the driving means driving the price exhibiting means. This prevents the accumulated errors due to dispensing too small quantities of liquid, and permits the correction of registration due to backlash and other errors by causing dispensing operations of suitable amounts, yet maintaining the errors within the tolerances permitted by the proper authorities such as sealers, bureaus of weights and measures and the like. A still further object of my invention is to provide such improved means which will operate automatically with a standard type of shutter mechanism and be operable by the resetting mechanism for the counter in a normal manner as regards the quantity counter, and then be automatically operative after a predetermined operation of the quantity counter to expose the cost counter, when a predetermined amount of gasoline representing a more fair indication of the percentage of error in normal operation has been indicated on the quantity counter and has had its price indicated on the cost counter. These and other advantages of my improved construction will, however, hereinafter more fully appear.

In the accompanying drawings I have shown for purposes of illustration, one embodiment of my invention applied to use in connection with a standard form of quantity and price indicating counter.

In these drawings:—

Fig. 2 is a view similar to Figure 1 but with the counter driving gears omitted to facilitate illustration, and with the shutter mechanism in normal running position with both counters exposed, this figure also having certain elements of the drive for the several counters indicated therein in dotted lines to facilitate illustration;

Fig. 3 is a detail front view showing the mechanism associated with the quantity counter for delaying the operation of the shutter on the cost counter, the view being taken from the left of Figure 2;

Fig. 4 is a detailed sectional view on line 4—4 of Figure 3, and

Figure 1:
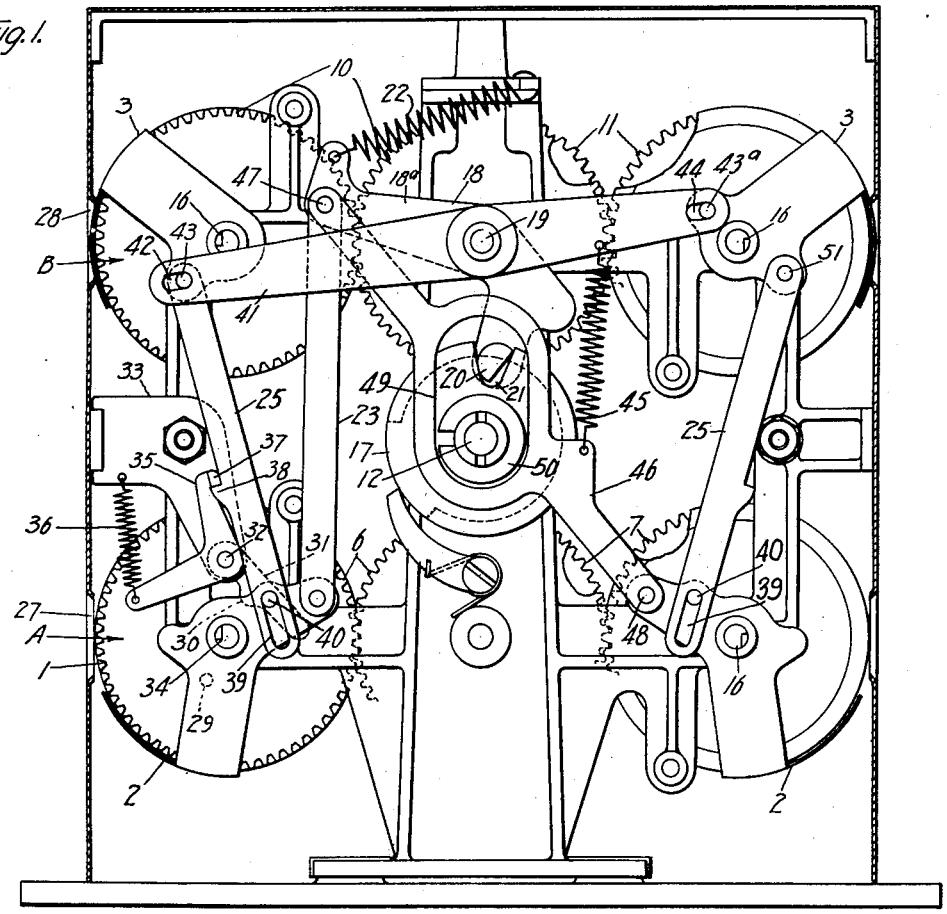
Figure 1 is an end view of such a counter, the casing being removed to show the mechanism including my improved shutter mechanism, the latter being shown in the position it assumes after resetting, with the quantity counter exposed by its shutter mechanism and the cost counter still shrouded by its shutter mechanism.
Figure 5:
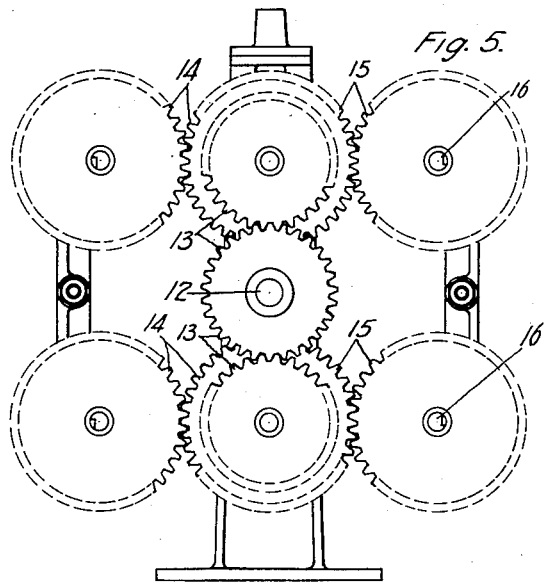
Fig. 5 is a view of the opposite side of the counter from that shown in Figure 1 and showing the reset drive.

In this illustrative construction I have shown my invention applied to use in connection with a standard Veeder-Root cost and quantity counter in general use in connection with gasoline dispensing pumps, the illustrated form of my invention including improved means hereinafter described, associated with the first wheels 1 of the lower quantity counters, generally indicated at A, and with the shutter mechanism 2 for the quantity counters A and also with the shutter mechanism 3 for the two upper cost counters, generally indicated at B, and this improved means having the function of delaying the opening of the shutters 3 until a predetermined quantity of gasoline has been indicated on the first wheels 1 of the quantity counters A.

As the counter per se forms no part of my present invention, the same need not be specifically described herein and only the parts thereof relating to my invention have been illustrated. However, it will be understood that in this type of counter, each quantity counter A comprises a plurality of coaxial number wheels suitably operatively connected by usual transfer mechanism (not shown) and that both counters are driven from a shaft 4 rotatable by a gasoline meter through suitable gearing including bevelled gearing 5 and meshing spur gearing 6 and 7, while the cost counters B are of similar construction and driven from a shaft 8 through corresponding bevelled gearing 9 and meshing spur gearing 10 and 11. Further, it will be understood that in this construction, a rotatable reset operating member or shaft 12 is operatively connected through suitable spur gearing 13, 14 and 15 to resetting shafts 16 coaxial with the several counters, and also with mechanism (not shown) operative upon rotation of these shafts 16 to return all of the counters A, B to zero position upon operation of the common reset operating member 12. Moreover, it will be understood that in this counter, the shutters 2 and 3 for the quantity and cost counters are also operatively connected to a cam 17 rotatable with the reset operating member or shaft 12 through a pivoted rocking bell crank lever 18 pivoted at 19 on the frame and having a cooperating depending cam portion 20, adapted to be received in an aperture 21 in the cam 17 in reset or zero position, and to ride around upon the periphery of the cam during the resetting operation. This bell crank 18, also has a laterally extending arm 18a extending to the left (Figs. 1 and 2) from its pivot 19 above the portion 20 and connected by a contractile spring 22 to the frame, while this arm 18a is also connected to a lower quantity counter shutter 2 by a link 23. Here it will also be noted that while the crank 18 is herein not connected to the shutters 3, the quantity counter shutters 2 are connected to the cost counter shutters 3 by connecting links 25 generally corresponding to those heretofore used.

In my improved construction, improved operative connections are associated with the shutter mechanism above described whereby, while enabling the shutters to function normally, i. e. with all the counters A and B covered by their shutters during resetting, and the quantity counter shutters 2 being returned to open position upon the completion of resetting, the opening of the cost counter shutters 3 is delayed until after a predetermined operation of the quantity counters A. In providing this mechanism, the shutter mechanism described has been modified in certain respects and improved means have been provided associated with the first wheel 1 of one of the quantity counters and one of the links 25, which are also of an improved construction, in such manner that the desired delayed opening of the shutters 3 is accomplished. Here also it will be understood that portions on the periphery of the first wheel 1 preferably are left blank, for example those portions normally bearing the numbers $\frac{1}{10}$, $\frac{2}{10}$, $\frac{3}{10}$ and $\frac{4}{10}$, so that, after 0, the first number appearing thereon is $\frac{5}{10}$, corresponding to five-tenths of a gallon, and wherein the 5 is the larger numeral to facilitate reading. Preferably also this first number and 0 are the only numbers on this first wheel. Further, it will be understood that my improved mechanism is operated when a selected number herein illustrated as this first number, hereafter referred to as 5, is opposite each window 27, through which the quantity counters are readable, and that when this number 5 is thus visible, the shutters 3 of the cost counters are moved from their closed position shown in Figure 1, to their open position shown in Figure 2, so that these counters are then for the first time readable through their windows 28.

Referring more particularly to my improved structure, it will be noted that a laterally extending pin 29 is provided on the side of the driving gear 6 of one number wheel 1, this pin 29 being so located that it assumes the position shown in Figure 1 when the wheel is in zero position and the position shown in Figure 2 when the selected number, herein 5, is opposite the window 27. Further, it will be observed that this pin 29 as it approaches the latter position, engages a lug 30 on a depending arm 31 which is fixed to and rotatable with a shaft 32 journaled in a portion 33 attached to the frame, the shaft 32 being above the pivot 34 of the shutter 2. Herein, it will also be noted that a bell crank 35 is rotatable with this shaft 32 and with the arm 31. This bell crank 35 has one laterally and downwardly extending arm connected by a coiled spring 36 to the frame portion 33 above the arm. The other arm of this bell crank carries on its extremity a latch member 37 which is extended laterally relative to the body of the arm and into the path of a lug 38 provided on the adjacent link 25. Attention is further directed to the fact that this link 25 is provided with an elongated slot 39 in its lower end permitting relative movement between the same and a pivot pin 40 carried on the shutter 2. Further, it will be noted that an upper transverse lever 41 is provided pivoted on the pivot 19 and outside the bell crank 18 and the link 23. This lever 41 is provided at one end with a slot 42 shorter than the slot 39 in which is disposed the pin 43 for operating one shutter 3 from the link 25. The other end of this lever 41 herein also has a slot 44 corresponding to the slot 42 and receiving a pin 43a of the other shutter 3. Moreover, it will be noted that a coiled spring 45 is connected between this end of the lever 41 and a connecting link 46. This link 46 is pivoted at its upper end at 47 to the arm 18a of the bell crank 18, coincident with the upper pivot of the link 23, and is also pivoted at its lower end, at 48, to the diagonally opposite lower or quantity counter shutter 2; the link 46 also being provided with an elongated enlarged cut out portion 49 to receive and avoid conflict with a hub or projection 50 movable with the cam 17. Attention is also directed to the fact that the right hand link 25 is herein provided at its lower end with an elongated slot 39, similar to that heretofore described and cooperating with a like pin 40, while the upper end of this link is connected by an unslotted pivotal connection 51 to its cost counter shutter 3.

In the use of my improved construction, it will be evident that upon rotation of the cam 17 by the reset operating member 12, the quantity counter shutters 2 and the cost counter shutters 3 will be operated to close the windows 27 and 28 during resetting and that the quantity counter shutters 2 will drop into open or inoperative position when resetting has been completed. However, due to my improved connections the cost counter shutters 3 will remain in closed position until, on the next operation of the pump, a quantity of gasoline has been dispensed sufficient to actuate the wheel 1 of one quantity counters A to rotate the blank portion of its periphery past the window and bring up the first number, herein 5 and indicating five-tenths of a gallon. When this number appears in the window, the pin 29 on the gear 6 of the first wheel 1 of the left hand quantity counter will engage the lug 30 on the arm 31 and thereby release the latch 37 from the lug 38 on the adjacent arm 25. Thereupon, due to the action of the spring 45 and the slotted connections 39, 42, 44, the link 25 and lever 41 will be operated in such manner as to throw up the cost counter shutters 3 and thereby, for the first time, expose the cost counters B, which then will indicate the cost of five-tenths of a gallon of gasoline. More particularly, when the link 25 is released by the latch 37, the spring 45, extended while the pin 29 is moving into engagement with the lug 30, is then free to pull down the right hand arm of the lever 41 and pull up the left hand arm thereof. As a result, both cost counter shutters 3 are swung up into their inoperative position, while the links 25 are moved upward until the pins 40 are in the bottom ends of the slots 39. This position of the parts, wherein both the quantity and cost counters are exposed, is maintained throughout the remainder of the counting operation, i. e. until operation of the counters is discontinued at the end of the dispensing operation, when the reset operating member 12 is manually operated to reset the wheels to zero. When resetting occurs, it will be evident that both sets of shutters 2 and 3 will be closed at the beginning of resetting and remain closed during resetting. Further, it will be evident that only the shutters 2 will open upon the completion of resetting, the link 46 and link 23 then being operative to throw the two lower shutters 2 into open position, while the latch 37 is brought into engagement with the lug 38 on the link 25 in such manner as to hold the cost counter shutters 3 in their closed position. Thus the parts, being returned to the position shown in Figure 1, are ready for a resumption of operation on the next dispensing operation, i. e. whenever the pin 29 again engages the lug 30.

As a result of my improvements, it will be noted that the possible field of use of standard price and quantity counters is materially extended. Further, testing or use in such manner as to obtain the accumulative error mentioned, is prevented. Moreover, it will be noted that the customer who seeks to purchase by price is protected in such manner that even an unscrupulous dealer may not sell him a quantity of gasoline by price which is less in amount than the selected minimum quantity approved, the controlling mechanism for the cost counter shutter acting to obscure the cost counter so that no sales by price can be made until at least the minimum quantity indication is also visible to permit the customer to check the price. These and other advantages of my improvements will, however, be clearly apparent to those skilled in the art.

While I have in this application specifically described one embodiment which my invention may assume in practice, it will be understood that this form of the same is chosen for purposes of illustration, and that the invention may be modified and embodied in other forms without departing from its spirit or the scope of the appended claims.

What I claim as new and desire to secure by Letters Patent is:

1. In a counting mechanism, cost and quantity counters having resetting mechanism, shutter mechanism having shutters shrouding said counters during resetting, and mechanism for successively opening said quantity and cost shutters having means for delaying the opening of said cost counter shutter until after a predetermined operation of said quantity counter.

2. In a counting mechanism, cost and quantity counters having resetting mechanism, shutter mechanism having shutters shrouding said counters during resetting, and mechanism for successively opening said quantity and cost shutters having means for opening said cost counter shutter after a predetermined operation of said quantity counter, said quantity counter having a number wheel and a blank preceding the first number thereon and said means being operative upon the exposure of said first number.

3. In a counter, counting mechanism having cost and quantity counters, resetting mechanism therefor, shutter mechanism for shrouding both counters during resetting and exposing said quantity counter upon completion of said resetting while continuing to shroud the cost counter, and means for actuating said shutter mechanism to expose the cost counter after a predetermined count on the quantity counter.

4. In a counter, counting mechanism having cost and quantity counters, resetting mechanism therefor, shutter mechanism shrouding both counters during resetting and exposing said quantity counter upon completion of said resetting including a latch connectible to continue the shrouding of the cost counter, and means for releasing said latch after a predetermined operation of said quantity counter.

5. In a counting mechanism, a plurality of cost counters, a plurality of quantity counters, resetting mechanism for said counters, shutters for said counters, means for closing all of said shutters during resetting and opening only the quantity counter shutters upon the completion of resetting, and means for opening the cost counter shutters after a predetermined operation of said quantity counters.

6. In a counting mechanism, cost and quantity counters, resetting mechanism for said counters, shutters for said counters, means for closing said shutters during resetting and opening only the quantity counter shutter upon the completion of resetting, and means for opening the cost counter shutter after a predetermined operation of said quantity counter, said quantity counter having a lowest order number wheel and a blank space on said wheel preceding the numbers on said wheel and said opening mechanism for the cost counter shutter being operated when the first number is exposed.

7. In a counting mechanism, cost and quantity counters, resetting mechanism for said counters, shutters for said counters, mechanism operative by said resetting mechanism for closing said shutters during resetting and opening the quantity counter shutter upon the completion of resetting and also having means tending to open said cost counter shutter and a latch connectible during resetting and restraining the opening means for said cost counter shutter, and means for releasing said latch after a predetermined operation of said quantity counter.

8. In a counting mechanism, a plurality of cost counters, a plurality of quantity counters, resetting mechanism for said counters, shutters for said counters, a controlling cam operative by said resetting mechanism, mechanism including shutter connected links controlled by said cam for opening said quantity counter shutters and tending to open said cost counter shutters, a latch connectible to one of said links during resetting and restraining the opening of said cost counter shutters, and means for releasing said latch after a predetermined operation of said quantity counters.

9. In a counting mechanism, a plurality of cost counters, a plurality of quantity counters, resetting mechanism for said counters, shutters for said counters, a controlling cam operative by said resetting mechanism, mechanism including shutter connected links controlled by said cam for opening said quantity counter shutters and tending to open said cost counter shutters, a latch connectible to one of said links during resetting and restraining the opening of said cost counter shutters, and means for releasing said latch after a predetermined operation of said quantity counters including a latch releasing member movable with the lowest order wheel of one of said quantity counters.

10. In combination, a cost counter, a quantity counter, shutter mechanism for said counters including shutters for each of the same and a spring connected link connecting said shutters and having a slotted connection with the quantity counter shutter, latching mechanism for said link, and means movable with said quantity counter for releasing said latching mechanism.

11. In combination, a cost counter, a quantity counter, shutter mechanism for said counters including shutters for each of the same and a spring connected link connecting said shutters and having a slotted connection with the quantity counter shutter, latching mechanism for said link including a bell crank, and means movable with the lowest order wheel of said quantity counter and engaging said bell crank for releasing said latching mechanism.

12. In registering mechanism, the combination of driving means, cost counting means driven by a portion of said driving means, reset mechanism for returning said cost counting means to initial position responsive to operation of a single manually operated member of the reset mechanism, shutter mechanism controlled by said reset mechanism for shrouding said cost counting means upon operation of said reset mechanism to return the cost counting means to its initial position, and means controlled by operation of another portion of said driving means after a predetermined operation of said driving means to cause movement of said cost counting means from said initial position for causing movement of said shutter mechanism to unshroud said cost counting means.

13. In registering mechanism, the combination of driving means, quantity exhibiting means, cost exhibiting means, reset mechanism for said cost and quantity exhibiting means, shutter mechanism for shrouding said cost exhibiting means upon operation of said reset mechanism, and means for causing movement of said shutter mechanism to unshroud said cost exhibiting means after a predetermined movement of said quantity exhibiting means by said driving means.

BYRON J. PEPPER.